United States Patent Office 3,554,775
Patented Jan. 12, 1971

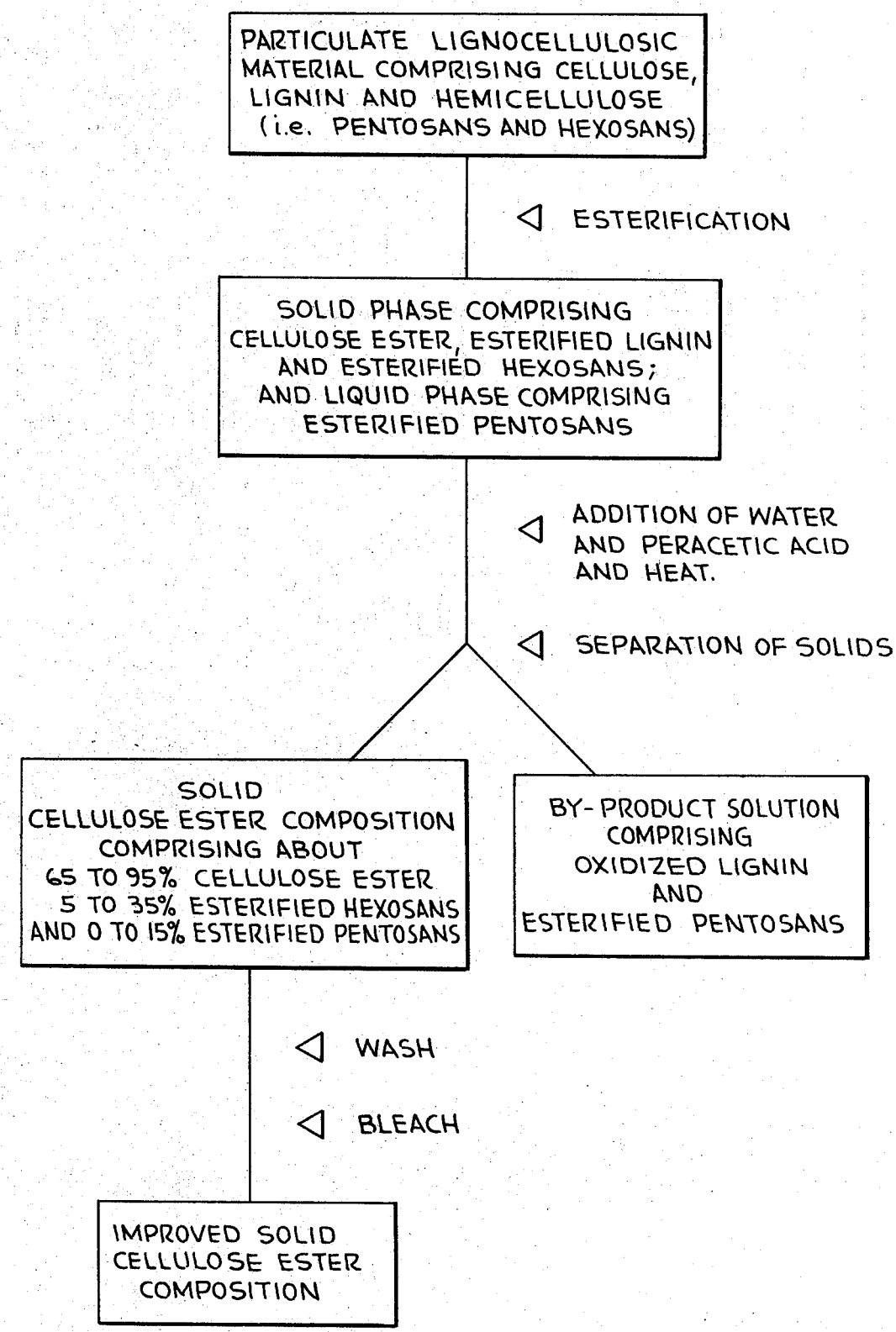

3,554,775
PRODUCTION OF CELLULOSE ESTERS
Derek Abson, Vancouver, British Columbia, Canada, and Richard P. Taylor, Chillicothe, Ohio, assignors to Columbia Cellulose Company Limited, Vancouver, British Columbia, Canada, a Canadian corporation
Filed Apr. 26, 1967, Ser. No. 633,832
Int. Cl. C08b 21/04; C09j 3/04
U.S. Cl. 106—196                                  7 Claims

ABSTRACT OF THE DISCLOSURE

A lignocellulosic material, such as sawdust, is esterified to produce a solid phase, and a liquid phase containing esterified pentosans; water and peracetic acid are added to the resulting solid and liquid phases; esterified lignin present in the solid phase is oxidized so as to pass into solution; and a solid cellulose ester composition is recovered which contains 65 to 95% cellulose ester, 5 to 35% esterified hexosans and 0 to 15% esterified pentosans. The resulting cellulose ester composition may be used in molding applications and possesses modified physical properties when compared with the corresponding cellulose ester.

BACKGROUND OF THE INVENTION

The present invention relates to cellulose ester compositions and processes for producing the same. More particularly, the invention concerns novel organic ester compositions comprising cellulose ester and esterified hexosans and a process for producing the same which may utilize an inexpensive lignocellulosic source material.

According to prior art commercial processes for the production of cellulose organic esters, such as cellulose acetate, it has generally been the goal of the chemical manufacturer to produce and market such cellulose esters in a relatively pure form. In order to accomplish this result it has been deemed essential to first obtain uncombined cellulose in a relatively pure form, and subsequently to esterify the same. For instance, for many years relatively short cotton fibers known as "cotton linters" have commonly been selected as a source material for the production of cellulose acetate largely because of the extremely high cellulose content, e.g., about 90 percent by weight, offered by this material. Prior to the actual acetylation of such materials, various impurities are commonly first removed by washing with dilute alkalis or acids to yield essentially pure cellulose.

Lignocellulosic materials, such as woods, have long been recognized as potential sources of cellulose which may be separated and subsequently esterified to produce relatively pure cellulose esters, such as cellulose acetate. In fact, in recent years softwoods have provided the bulk of the cellulose which is subsequently acetylated to produce cellulose acetate. The common technique for the recovery of cellulose from a lignocellulosic material has involved various chipping, pulping, and purification procedures whereby substantially all of the lignin and hemicellulose impurities present are dissolved and removed from the wood. Prior to actual acetylation, the resulting cellulose is commonly soaked in a lower aliphatic acid solution to swell the fibers of the same in an effort to render the same more accessible to chemical reaction. Extremely finely divided and more readily available lignocellulosic materials, such as sawdust, may be pulped only with considerable difficulty according to the prior art, and have consequently been used commercially to only a minor extent for the production of relatively impure cellulose, such as that used to make relatively low quality paper.

While it is known that the direct acetylation of untreated wood in board or finely divided form will modify the properties of the wood and produce a substantial quantity of acetylated carbohydrates, a commercially practical method for recovering cellulose triacetate produced by such an acetylation process has not been available. We have found by experimentation, for instance, that if solvent extraction using known solvents for cellulose triacetate is attempted, a product is recovered in low yields which has an unusually low viscosity and is contaminated with a relatively high proportion of acetylated hemicelluloses. The bulk of the high grade cellulose triacetate present apparently remains somewhat chemically and/or physically bound in the wood or wood fragments, along with lignin as an insoluble residue. U.S. Pat. No. 2,151,412, to Sherrard et al., discloses the preliminary swelling and acetylation of finely ground wood to produce a relatively crude product which may be used in molding applications. While the direct acetylation of lignocellulosic board materials may advantageously improve the properties of the same, as disclosed in U.S. Pat. No. 2,417,995, to Stamm et al., a commercially practical process for producing and recovering high quality cellulose esters by the direct esterification of lignocellulosic materials has not been available to industry in the past.

It is an object of the invention to provide novel cellulose ester compositions and a process for the high yield production and recovery of the same which utilizes lignocellulosic source materials.

It is also an object of the present invention to provide an economical process for the production of cellulose ester compositions which may utilize a wide variety of inexpensive source materials.

It is another object of the present invention to provide a process for the production and recovery of cellulose ester compositions which does not require that cellulose be in a relatively pure form prior to esterification.

It is yet another object of the present invention to provide a process for the production of cellulose ester compositions from a lignocellulosic material which may be conducted in a single reaction zone without the need for dissolution and subsequent precipitation of the product.

It is a further object of the present invention to provide a process for the production of cellulose ester compositions in which the cellulose ester component of the composition is free from substantial degradation.

It is still another object of the invention to provide a process for the production of cellulose ester compositions comprising cellulose triacetate and acetylated hexosans using a lignocellulosic material as the cellulose source material which eliminates the need for preliminary pulping prior to esterification.

These and other objects, as well as the scope, nature and utilization of the invention will be apparent from the following detailed description and appended claims.

DESCRIPTION OF THE DRAWING

The drawing illustrates a schematic flow diagram of an embodiment of the inventive process.

SUMMARY OF THE INVENTION

It has now been discovered that a process for the production of a cellulose organic ester composition comprises esterifying a particulate lignocellulosic material which initially comprises cellulose, lignin, hemicellulose (i.e., pentosans and hexosans) with a carboxylic acid anhydride or mixtures thereof to produce an esterification mixture consisting of a solid phase comprising cellulose ester, esterified lignin and esterified hexosans, and a liquid phase comprising dissolved esterified pentosans; heating the esterification mixture in the presence of peracetic acid and water to produce a solid cellulose organic ester composition comprising cellulose ester and esterified hexosans, and a liquid by-product comprising dissolved esterified pentosans and oxidized lignin; and recovery the solid cellulose organic ester composition.

The solid cellulose organic ester composition produced by the instant process commonly comprises about 65 to 95 percent by weight of cellulose ester, about 5 to 35 percent by weight esterified hexosans, and about 0 to 15 percent by weight esterified pentosans. A particularly preferred ester composition comprises about 75 percent by weight cellulose triacetate, and about 25 percent by weight acetylated hexosans.

DESCRIPTION OF THE PREFERRED EMBODIMENTS

The term "lignocellulosic material," as used in the specification and appended claims, is equated with the term "lignocellulose," as defined in The Condensed Chemical Dictionary, Sixth Edition. Such material is formed from plant tissue compounds and contains cellulose, lignin, and hemicellulose in combined form. Both softwoods and hardwoods come within this definition. Illustrative examples of various softwoods which may be used in accordance with the present invention include hemlock, balsam, and spruce. Illustrative examples of various hardwoods which may be used in accordance with the present invention include cottonwood, aspen, birch and maple. In addition to softwoods and hardwoods, other lignocellulosic materials, such as straw, grass, bagasse, and bamboo may likewise be utilized in the instant process.

The cellulose component of the lignocellulosic material is usually the predominant solid component present therein. Lignin, which serves as a binding material, and "hemicellulose" which identifies a group of polysaccharides other than cellulose commonly present in wood are the other major solid components. The table which follows summarizes the relative proportions of these components commonly encountered in woods.

|  | Softwoods | Hardwoods |
|---|---|---|
| Percent: |  |  |
| Cellulose | 40-44 | 40-55 |
| Lignin | 29-33 | 16-24 |
| Hemicellulose | 25-30 | 27-40 |

The primary constituents of hemicellulose are pentosans and hexosans. Pentosans are polymers principally of pentose sugars and are commonly present in wood in a concentration of about 6 to about 30 percent by weight. Hexosans are polymers principally of hexose sugars and are commonly present in wood in a concentration of about 4 to about 20 percent by weight. These polymers upon hydrolysis yield predominantly pentoses and hexoses respectively. The relative quantities of pentosans and hexosans within wood tend to vary with the particular type of wood selected. For instance, the hemicellulose found in hardwoods tends to contain a greater proportion of pentosans than the hemicellulose in softwoods. Major pentosans include araboxylan and 4-0-methyl-D-glucurono-araboxylan. Major hexosans include glucomannan and galactoglucomannan.

The lignocellulosic materials treated in accordance with the present invention are preferably divided into particulate form prior to the esterification step of the instant process. Particle sizes up to about ¼ inch may be treated in accordance with the present invention. If particle sizes much above ⅜ inch are utilized, then penetration and diffusion difficulties are encountered. The preferred particle size range is about ⅛ to about ¼ inch. Readily available sawdust of soft or hard woods, as accumulated at sawmills, forms the preferred lignocellulosic material. This material is commonly available in many areas in large quantities and has hitherto been accorded little or no economic value, except as an inexpensive fuel for industrial purposes. It is, of course, possible to grind, to mill, or to chip wood to the desired particulate form, and subsequently to treat the wood according to the present invention should less expensive and previously divided lignocellulosic source materials not be utilized.

The lignocellulosic material is esterified under anhydrous conditions as the initial step in the production of any one of a variety of cellulose organic ester compositions. The raw material may be dried to a low moisture content and the residual water removed by exchange with acetic acid. The esterification is conducted under conditions so that in addition to the esterification of the cellulose and lignin components an esterification and partial fractionation of the two primary hemicellulose components also results. The hexosans derived from the hemicellulose are esterified and remain largely chemically and/or physically bound to the esterified cellulose and esterified lignin in a solid phase which closely resembles the lignocellulosic material prior to esterification. The pentosans derived from the hemicellulose are likewise esterified, but tend to pass into the liquid phase of the resulting esterification mixture. By the initial esterification step the esterified cellulose and esterified hexosans are rendered largely resistant to the subsequent steps of the instant process.

Organic carboxylic acid anhydrides, such as acetic anhydride, propionic anhydride, and butyric anhydride, may be utilized, either as the sole esterification agent or in combination with other anhydrides. Specific illustrative examples of cellulose esters which may be produced to form the major component of compositions according to the invention include cellulose triacetate, cellulose acetate propionate, cellulose acetate butyrate, cellulose propionate, and cellulose butyrate. Esterification procedures employing an acid catalyst, an acetic acid solvent, and agitation may be utilized. A suitable acid catalyst is sulfuric acid. Standard procedures for maintaining an exothermic esterification reaction below about 60° C. are advantageously employed to aid in the formation of a homogeneous product.

Cellulose triacetate compositions are the preferred ester compositions which may be produced according to the present invention. Such cellulose triacetate compositions may be formed utilizing the combinaton of acetic anhydride, acetic acid, and an acid catalyst. Sulfuric acid in a concentration between about 2 and about 10 parts by weight per each 100 parts of lignocellulosic material is the preferred catalyst. Other preferred esterification reaction conditions include about 150 to about 250 parts by weight acetic anhydride and about 350 to about 600 parts by weight acetic acid per each 100 parts of lignocellulosic material, a reaction period between about 1 and about 3 hours, and a reaction temperature between about 30° C. and about 60° C.

According to the present invention the esterification mixture is next reacted at an elevated temperature in the presence of peracetic acid and water. It has been found that the selective delignifying power of peracetic acid effectively results in the oxidation of the esterified lignin present in the solid phase and facilitates the solution of the same in the absence of the undue concomitant degradation of the esterified cellulose and esterified hemicellulose fraction which remain in the solid phase. The lignin impurities are therefore effectively dissolved out of the solid phase so as to yield the organic ester compositions of the present invention. The reaction may be conducted in the same reaction zone in which the esterification step of the process was previously conducted merely by the addition of peracetic acid, water, and heat. In a particularly preferred embodiment of the invention an additional quantity of acetic acid is also added. The reaction conditions are such that the esterified cellulose and esterified hexosans are not dissolved to any appreciable degree, and the dissolved acetylated pentosans and oxidized lignin components are not precipitated within the reacton zone.

In a particularly preferred embodiment of the invention 200 to 700 parts by weight of (a) peracetic acid, (b) water, and (c) acetic acid are added to the esterification mixture per each 100 parts of lignocellulosic material originally present. The proportions of these ingredients are adjusted so as to provide an aqueous solution containing about 2 to 10 percent by weight peracetic acid and at least about 70 percent by weight acetic acid, e.g., about 70 to 80 percent by weight. The reaction of the esterification mixture in the presence of the aqueous peracetic acid solution is preferably conducted at an elevated temperature between about 70° C. and about 100° C. for about 90 to about 180 minutes.

If desired the aqueous peracetic acid solution which is reacted with the esterification mixture may be formed in situ by the addition of hydrogen peroxide and water to the esterificaton mixture. The quantity of acid catalyst remaining from the esterification step of the process may be utilized to facilitate the reaction of the hydrogen peroxide with acetic acid and/or acetic anhydride present in the reaction zone.

As indicated in column 1 of U.S. Patent No. 2,151,412 to Sherrard et al., work has been reported in the literature in which lignocellulosic materials have been acetylated, and delignified in an effort to gain more insight into the chemical make-up of the various wood constituents. Such delignification of acetylated wood was conducted under severe conditions and employed pulping agents such as chlorine and sodium bisulfite; or chlorine, sodium sulfite, and potassium permanganate. These investigations should not be confused with the instant commercially feasible process for the production of cellulose organic ester compositions. As stated above, the instant process may be conducted in a single reaction zone with the esterification medium forming the basis for the subsequent delignification medium. Also, the delignification step in the instant process is conducted without significant de-esterification or depolymerization of the esterified product.

Following the peracetic acid reaction step of the present process of the solid cellulose organic ester composition is separated from the liquid by-product containing dissolved esterfield pentasans and oxidized lignin and the cellulose ester composition is recovered. The solid residue which is a generally white, fibrous, substantially lignin free solid may be conveniently separated from the liquid phase by filtration or by centrifugation. Centrifugation is the preferred procedure for separation.

If desired, the cellulose ester composition may be subsequently washed with aqueous acetic acid and then with alcohol and/or bleached with an oxidizing agent to remove any residual amounts of lignin present therein. Suitable oxidizing agents include chlorine dioxide and sodium chloride. Also, the cellulose ester composition may be partially hydrolyzed, as is common according to the prior art with respect to relatively pure cellulose esters, in order to modify the properties thereof such as the solubility in certain solvents.

The cellulose ester compositions produced according to the present invention possess unique physical properties and are suited for a variety of end uses including those in which cellulose esters have been employed in the past. The presence of esterified hexosans within the cellulose ester composition either alone or in combination with esterified pentosans acts as an internal lubricant and provides a molded article formed from the same with improved flexibility.

The following examples are given as specific illustrations of the invention. It should be understood, however, that that the invention is not limited to the specific details set forth in the examples.

Example I

Hemlock sawdust (softwood) composed of approximately 45 percent by weight cellulose, 30 percent by weight lignin, and 25 percent by weight hemicellulose (chiefly hexosans or glucomannan) on an extractives free basis was screened to remove particles retained by a 1/10 inch mesh. 100 parts by weight of the solid was soaked in glacial acetic acid to removed residual traces of water. The sawdust was filtered, pressed, and transferred to a constant temperature glass-lined reaction vessel equipped with a stainless steel stirrer. Additional glacial acetic acid was added to the solid, and then a mitxure of acetic acid, acetic anhydride and sulfuric acid was added with stirring so that the composition of the acetylation solution at the start of the reaction was 500 parts by weight acetic acid, 200 parts by weight acetic anhydride, and 4.5 parts by weight sulfuric acid. The temperature of the resulting mixture was raised to 50° C. and maintained at that temperature for 1½ hours. An aqueous solution containing 40 parts by weight peracetic acid, 80 parts by weight acetic acid and 250 parts by weight of water was stirred into the acetylation mixture. The temperature was raised to 90° C. and the mixture was stirred for 2 hours after which time the solution had assumed a pale orange color. The mixture was removed from the reaction vessel and centrifuged to removed the bulk of the liquid from the residual fibrous solid. The solid was next suspended in a mixture of 80 parts by weight acetic acid and 20 parts by weight water and again centrifuged. The residual white solid was then stirred with ethanol, filtered, washed with ethanol and dried. The yield of cellulose acetate composition, which was essentially free of lignin, was about 55 parts by weight. The product had an intrinsic viscosity of about 2.0 (measured on the regenerated cellulose in cuprienthylene diamine solution). Deacetylation and hydrolysis of the product gave a mixture of sugars containing only glucose and mannose, in a weight ratio of 3:1. The ester composition was soluble in methylene chloride and insoluble in acetone.

Example II

Cottonwood sawdust (hardwood) composed of approximately 55 percent by weight cellulose, 25 percent by weight lignin, and 20 percent by weight hemicellulose (chiefly pentosans) on an extractives free basis was acetylated with acetic anhydride in the presence of sulfuric acid and acetic acid under conditions essentially the same as those described in Example I. To the mixture obtained after acetylation was added a solution containing 25 parts by weight peracetic acid, 95 parts by weight acetic acid, and 250 parts by weight of water. The resulting mixture was stirred at a temperature of 80° C. for 2 hours to yield a fibrous solid which was isolated and washed with aqueous acetic acid and with ethanol as described in Example I. The yield of solid cellulose acetate composition was 50 parts by weight. Deacetylation and hydrolysis of this product resulted in a mixture of sugars containing glucose, xylose, and mannose in a weight ratio of 12:1.6:1.

Although the invention has been described with preferred embodiments, it is to be understood that variations and modifications may be resorted to as will be apparent to those skilled in the art. Such variations and modifications are to be considered within the purview and scope of the claims appended hereto.

We claim:

1. A process for the production of a cellulose organic ester composition comprising esterifying under anhydrous conditions a particulate lignocellulosic material having particle sizes up to about ¼ inch which initially comprises cellulose, lignin, pentosans, and hexosans with a carboxylic acid anhydride or mixtures thereof to produce an esterification mixture consisting of a solid phase comprising cellulose ester, esterified lignin and esterified hexosans, and a liquid phase comprising dissolved esterified pentosans; adding to the resulting acetylated mixture 200 to 700 parts by weight peracetic acid, acetic acid and water in proportions sufficient to provide an aqueous solution containing about 2 to 10 percent by weight peracetic acid and about 70 to 80 percent by weight acetic acid; heating said mixture to a temperaure of from about 70 to 100° C. for about 90 to 180 minutes to produce a solid cellulose organic ester composition comprising cellulose ester and esterified hexosans, and a liquid by-product comprising dissolved esterified pentosans and oxidized lignin; and separating said solid cellulose organic ester composition from said liquid by-product.

2. A process according to claim 1 in which the particulate lignocellulosic material is wood.

3. A process according to claim 1 in which the solid cellulose ester composition comprises about 65 to 95 percent by weight of a cellulose ester selected from the group consisting of cellulose triacetate, cellulose propionate, cellulose butyrate, cellulose acetate propionate and cellulose acetate butyrate; about 5 to 35 percent by weight esterified hexosans; and about 0 to 15 percent by weight esterified pentosans.

4. A process for the production of a cellulose triacetate composition comprising acetylating under anhydrous conditions a lignocellulosic material in particulate form which has particle sizes up to about ¼ inch and initially comprises cellulose, lignin, pentosans and hexosans as its major components to produce an acetylation mixture consisting of a solid phase comprising cellulose triacetate, acetylated lignin and acetylated hexosans, and a liquid phase comprising dissolved acetylated pentosans; adding to the resulting acetylated mixture 200 to 700 parts by weight peracetic acid, acetic acid and water in proportions sufficient to provide an aqueous solution containing about 2 to 10 percent by weight peracetic acid and about 70 to 80 percent by weight acetic acid; heating said mixture to a temperature of from about 70 to 100° C. for about 90 to 180 minutes to produce a solid cellulose triacetate composition comprising cellulose triacetate and acetylated hexosans and a liquid by-product comprising dissolved acetylated pentosans and oxidized lignin; and separating said cellulose triacetate composition from said liquid by-product.

5. A process according to claim 4 in which the particulate lignocellulosic material is wood.

6. A process according to claim 4 in which the cellulose triacetate composition comprises about 65 to 95 percent by weight cellulose triacetate; about 5 to 35 percent by weight acetylated hexosans; and about 0 to 15 percent acetylated pentosans.

7. A process for the production of a cellulose triacetate composition comprising mixing 100 parts by weight of a lignocellulosic material in particulate form which has particle sizes up to about ¼ inch and initially comprises cellulose, lignin, pentosans, and hexosans as its major components, with 150 to 250 parts by weight acetic anhydride, 350 to 600 parts by weight acetic acid, and 2 to 10 parts by weight of an acid catalyst; maintaining the resulting mixture under anhydrous conditions at a temperature of 30° C. to 60° C. for from about 90 to 180 minutes until the lignocellulosic material is substantially completely acetylated to produce an acetylation mixture consisting of a solid phase comprising cellulose triacetate, acetylated lignin, and acetylated hexosans and a liquid phase comprising dissolved acetylated pentosans; adding to the resulting acetylated mixture 200 to 700 parts by weight peracetic acid, acetic acid and water in proportions sufficient to provide an aqueous solution containing about 2 to 10 percent by weight peracetic acid and about 70 to 80 percent by weight acetic acid; maintaining the resulting mixture at a temperature of 70° C. to 100° C. to produce a solid cellulose triacetate composition comprising cellulose triacetate and acetylated hexosans and a liquid by-product comprising dissolved acetylated pentosans and oxidized lignin; and separating the solid cellulose triacetate composition from the liquid by-product.

References Cited

UNITED STATES PATENTS

| | | | |
|---|---|---|---|
| 2,151,412 | 3/1939 | Sherrard et al. | 260—229 |
| 2,417,995 | 3/1947 | Stamm et al. | 260—229 |
| 3,094,431 | 6/1963 | Goldstein et al. | 260—229 |

ALLAN LIEBERMAN, Primary Examiner

U.S. Cl. X.R.

106—169; 260—230